July 26, 1966 E. L. ZEHRBACH 3,262,568
AUTOMATIC FILTER MECHANISM FOR DRYCLEANER
Filed Dec. 23, 1963
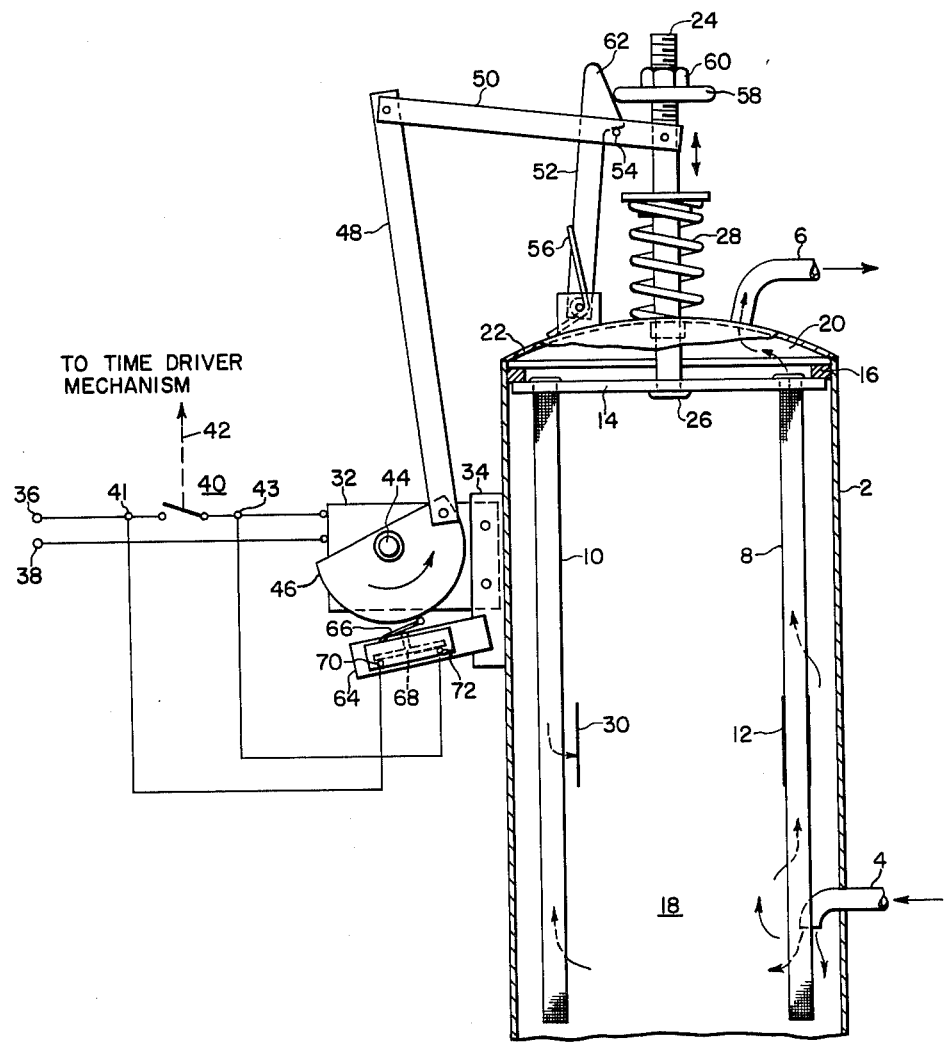
WITNESSES
Theodore F. Wrobel
James F. Young
INVENTOR
Edgar L. Zehrbach
BY United States Patent Office 3,262,568
Patented July 26, 1966

3,262,568
AUTOMATIC FILTER MECHANISM FOR DRYCLEANER
Edgar L. Zehrbach, Mansfield, Ohio, assignor to Westinghouse Electric Corporation, East Pittsburgh, Pa., a corporation of Pennsylvania
Filed Dec. 23, 1963, Ser. No. 332,533
6 Claims. (Cl. 210—138)

The present invention relates to filter mechanisms for use in drycleaning apparatus, and more particularly to automatic filter mechanisms which automatically clean the filter after each drycleaning.

Filters of a fine weave screen structure are used in the drycleaning trade to trap dirt and slime from cleaning fluid after it has been used in the drycleaner. The screen mesh is fine enough to retain a powder known as a "cake" after depositation which usually comprises a diatomaceous earth, activated carbon and a sweetener mixture. This cake is disposed on the screen surface of the filter by adding the mixture to the cleaning fluid and then pumping the mixture through the screen, with the cake being formed and retained by the fine weave mesh of the screen. During the operation of the drycleaning apparatus the pores of the cake become clogged with dirt and slime which resists the flow of cleaning fluid. Under extreme conditions, the filter may be completely blinded during one cleaning operation. To unclog the filter it has been necessary manually to turn the driving pump off and permit the cake to be dropped or shaken from the screen. The cake is then reconstituted on the screen by starting the pump again. However, the blinding layer will be broken up and the resistance to the flow of cleaning fluid through the filter normally will be materially reduced.

Automatic filter unclogging processes using a hydraulic drive mechanism have been suggested, however, these have several disadvantages. In the hydraulic method, only one jarring action or "bump" is available to dislodge the cake from the filter. Extra valving and expensive components are required and an empty filter could not be bumped.

It is therefore an object of the present invention to provide a new and improved automatic filter having a positive drive mechanism.

It is a further object of the present invention to provide a new and improved automatic filter for use in drycleaning apparatus in which multiple bumps are available and a minimum amount of driving apparatus is required.

Broadly, the present invention provides an automatic filter for use in drycleaning apparatus in which cleaning fluid is pumped through a screen mesh structure in the filter, the mesh structure being coated with a filtering mixture. Cake which adheres to the filter screen after the cleaning operation is shaken therefrom by the bumping action of a motor driven mechanism which causes the cake to fall from the filter due to mechanical and reverse hydraulic force. The bumping action occurs in a timed manner after the close of the washing period and during the drying period and may be repeated a number of times and the cake reconstituted and the fluid cleared up before the beginning of a new cycle.

These and other objects and advantages of the present invention will become more apparent when considered in view of the following specification and drawing, in which:

The single figure is a schematic-sectional diagram of the filtering mechanism.

Referring to the single figure, a filter mechanism is shown having a body 2, which is of substantially a cylindrical shape, and has a bottom inlet 4 and a top outlet 6. A driving pump, not shown, drives cleaning fluid through the inlet 4, through the cleaning structure within the body 2 and out the outlet 6. A plurality of fine mesh filter tubes 8, 10, only two of which are shown, are disposed longitudinally within the body 2 and are placed substantially parallel to each other. Onto the surface of the filter tubes adheres a coating of cake comprising a filtering mixture which may be comprised of diatomaceous earth, activated carbon and a sweetener. The cake layer is shown schematically on the tube 8 at the area 12. The filtering mixture is porous and will permit cleaning fluid to pass through the cake, while filtering out dirt and slime.

A tube support sheet 14 is fixed to the top of each of the filtering tubes 8, 10 to secure these tubes in position within the body 2. The support sheet 14 permits the top opening of the tubes to be free but seals the area around the periphery of the tubes. A sealing ring 16 is fixed to the body 2 and acts in conjunction with the tube support sheet 14 to divide the filter body into a lower filtering chamber 18 and a top manifold chamber 20. The sealing ring 16 serves to seal the chambers 18 and 20 with the tube support 14 being held contiguously to the sealing ring 16 so that cleaning fluid must pass through the top openings in the filter tubes in order to pass from the lower chamber 18 into the top chamber 20 and thence out the outlet 6. In this process, the cleaning solution must pass through the filtering cake and thus be filtered of dirt and slime. The path of the cleaning fluid is shown by arrows on the figure.

A top cover 22 fits over the filter body 2 to form a sealed structure. Down through the top cover 22 extends a driving shaft 24 which is secured to the tube support sheet 14 at the junction 26. A coil spring 28, secured to the shaft 24 and abutting against the top of the top member 22, serves to seal the joint between the tube support 14 and the sealing ring 16, with the spring 28 forcing the tube support 14 up against the sealing ring 16. If the rod 24 is driven downwardly to separate the tube support 14 from the sealing ring 16 and then suddenly returned to its original position under the biasing force of the spring 28, the cake, including dirt and slime, will be forced from the tubes 8, 10 due to a mechanical reaction and also reverse hydraulic force. This action is shown schematically at the area 30 of the tube 10. As a result of this bumping action, a large percentage of the filter tube structure will be automatically cleared from the clogging of the porous cake material on the tubes.

To drive the rod 24, a motor and driving mechanism are provided. A gear-motor 32 is secured by a bracket 34 to the body 2 of the filter. The gear-motor may comprise such a motor well known in the art and operative to provide a mechanical output of 3 or 4 revolutions per minute, for example. An electrical input, which may comprise 120 volt, 60 cycle power, available locally, is applied to the terminals 36 and 38. In series with the terminal 36 and the electrical input to the gear-motor 32, is an input switch 40 connected between junctions 41 and 43. A mechanical connection 42 is shown, schematically, connected to the throw arm of the switch 40. The mechanical connection 42 goes to the timer drive mechanism of the drycleaning apparatus. Timer drive mechanisms are well known and serve to control the various operational sequences of such apparatus and may in this instance serve to close the switch 40 once the washing period has completed. Once the switch 40 is closed, the motor 32 will be energized to provide a mechanical output at its output shaft 44. A mechanical output will continue to be supplied from the shaft 44 as long as the motor 32 is energized, with the shaft rotating at three or four revolutions per minute, for example.

Connected to the shaft 44 is a cam 46. The cam is shown to be of a semicircular shape and is driven as indicated by the arrow in a counterclockwise direction when the motor 32 is energized. Connected pivotally at the periphery of the cam 46 is a connecting member 48, which for example may be riveted to the cam 46. To the other end of the connecting member 48 is pivotally connected a lever 50, for example, by riveting. The other end of the lever 50 is secured pivotally to the driving shaft 24. Serving as a fulcrum or pivot point for the lever 50 is a latch 52 which has a hooked portion which fits over a stud 54 fitted into the lever 50. The latch 52 is secured to the top member 22 of the filter pivotally and is secured in its normal position against the stud 54 by the action of a spring 56, fitted between the top member 22 and the latch 52. A trip disk 58 is threaded onto the drive shaft 24 and secured thereto by a lock nut 60. The trip disk 58 serves to cam against the top surface 62 of the latch 52 and force it away from the stud 54 as the shaft 24 is driven downwardly.

At some predetermined time after the end of the washing period, the timer drive mechanism causes the switch 40 to close and thereby energizes the gear-motor 32. The gear-motor 32 provides a mechanical output at its shaft 44 to cause the cam 46 to rotate in a counterclockwise direction. The connecting member 48 will be forced upwardly, while the lever 50 will be forced downwardly at its end connected to the drive shaft 24 due to the pivoting action around the stud 54. The drive shaft 24 will thus be driven downwardly to force the tube support 14 along with the filter tubes 8, 10 away from the sealing ring 16. As the drive shaft 24 is driven downwardly the trip disk 58 engages the surface 62 of the latch 52 and forces the latch 52 away from the stud 54. Since the spring 28 is being compressed during the downward movement of the shaft 24, once the latch 52 is forced away from the stud 54, the filter tube support 14 will be forced upwardly with a jarring action against the sealing ring 16. This bumping or jarring action will force cake, such as shown at 30 away from the filter tubes due to both the mechanical jarring and reverse hydraulic pressure caused by the vigorous closing of the plate surfaces 14 and 16. Once the shaft 24 is in its normal position the latch 52 will again engage the stud 54 and this cycle will continue as long as the gear-motor 32 continues to rotate. After a predetermined time, the timer drive mechanism will cause the switch 40 to open through the mechanical connection 42, and thus deenergize the gear-motor 32 and stop the bumping action.

To insure that the gear-motor 32 is not deenergized or stopped with the tube support 14 away from the sealing ring 16, a safety switch 64 is provided. If the tube support 14 and the sealing ring 16 were held apart, the cleaning fluid would bypass the filtering action of the filter tubes 8, 10, during the next washing cycle of the drycleaning operation. The safety switch 64 is secured to the bracket 34 and is shown schematically to be a normally opened switch having a roller-type plunger 66. The plunger 66 under the action of the semicircular surface of the cam 46 forces the contact 68 of the switch toward the two terminals 70 and 72 of the switch. The terminals 70 and 72 are connected respectively to the junctions 41 and 43, and thus cause the switch 64 to directly shunt the switch 40.

When the cam 46 rotates, with the gear-motor 32 energized, its semicircular section will cause the plunger 66 to hold, with the contact in a position engaging the terminals 70 and 72. This will short across the switch 40 and will permit the motor 32 to remain energized even if the switch 40 should open due to some malfunction. Thus, the motor 32 will continue to be energized as long as the semicircular portion of the cam 46 engages the plunger 66 and forces the contact 68 against the contacts 70 and 72. With the cam 46 so acting, the tube support 14 and the sealing ring 16 will be in a normal contiguous position so that the input switch 40 may be opened. A new drycleaning cycle may then be commenced with the cleaning fluid substantially cleansed of dirt due to the filtering process.

Additional advantages of the positive drive mechanism of the present filter may be seen. The filter tubes may be bumped a plurality of times to insure that all the cake is forced away from the tubes. The electrical circuit used is simpler than a hydraulic system would be. Also fewer valves are required and less expensive components. Relatively few joints are necessary to insure a sealed filter and also the filter can be bumped with the machine in its stand-by position and also with the filter empty. Also it should be noted the pump is always off when the filter is bumped.

Although the present invention has been described with a certain degree of particularity, it should be understood that the present disclosure has been made only by way of example and that numerous changes in the details of construction and the combination and arrangement of parts may be resorted to without departing from the scope and spirit of the present invention.

I claim as my invention:

1. In drycleaning automatic filter mechanism, the combination of: a filter vessel for passing a cleaning fluid therethrough to be filtered; a plurality of fine mesh tubes disposed within said vessel, each of said tubes having disposed on the surface thereof a filtering mixture; a tube support sheet fixed to said plurality of tubes to support said plurality of tubes; a sealing ring disposed within said vessel contiguous to said tube support sheet to seal around said plurality of tubes so that the only openings normally through said vessel is through said plurality of tubes; a driving assembly including a gear-motor; said driving assembly being operative to cause said tube support sheet to be forced away from said sealing ring due to the action of said gear-motor, with said tube support sheet after being moved a predetermined distance being returned vigorously to its normal position contiguous to said sealing ring so that said plurality of tubes will be cleared of any clogging matter disposed thereon during the drycleaning operation; and a safety switch to prohibit said gear-motor from stopping while said tube support sheet is away from said sealing ring.

2. In drycleaning automatic filter mechanism, the combination of: a filter vessel including a lower chamber with an inlet and an upper chamber with an outlet to permit a cleaning fluid to pass therethrough to be filtered; a plurality of fine mesh tubes disposed longitudinally within said vessel between said inlet and outlet, each of said tubes having disposed on the surface thereof a filtering mixture; a tube support sheet fixed to said plurality of tubes to support said plurality of tubes; a sealing ring disposed between said upper and lower chambers contiguous to said tube support sheet to seal around said plurality of tubes so that the only openings normally into said upper chamber is through said plurality of tubes; a driving rod connected to said tube support sheet; a gear-motor having an input switch connected in its electrical input circuit; a mechanical linkage connecting said gear-motor and said driving rod; said gear-motor being operative to provide a mechanical output upon the closure of said input switch after the drycleaning operation and cause said tube support sheet to be forced away from said sealing ring due to the action of said mechanical linkage and said driving rod, after said driving rod has moved a predetermined distance said tube support sheet returning vigorously to its normal position contiguous to said sealing ring so that said plurality of tubes will be cleared of any clogging matter disposed thereon during the drycleaning operation; and a safety switch operatively connected across said input switch to prohibit said gear-motor from stopping while said tube support sheet is away from said sealing ring.

3. In drycleaning automatic filter mechanism, the combination of: a filter vessel including a lower chamber with an inlet and an upper chamber with an outlet to permit a cleaning fluid to pass therethrough to be filtered; a plurality of fine mesh tubes disposed longitudinally within said vessel between said inlet and outlet, each of said tubes having disposed on the surface thereof a filtering mixture; a tube support sheet fixed to said plurality of tubes at the top end thereof to support said plurality of tubes; a sealing ring disposed between said upper and lower chambers contiguous to said tube support sheet to seal around said plurality of tubes so that the only openings normally into said upper chamber is through said plurality of tubes; a driving rod connected to said tube support sheet; a tripping member connected to said driving rod; a gear-motor having an input switch connected in its electrical input circuit and a camming member connected to its mechanical output; a mechanical linkage connecting said camming member and said driving rod; a latching member acting as a fulcrum for said mechanical linkage; a spring biasing said driving rod so that normally during the drycleaning operation said tube support sheet will be held contiguously to said sealing ring; said motor being operative to provide a mechanical output upon the closure of said input switch after the drycleaning operation and cause said tube support sheet to be forced away from said sealing ring due to the action of said mechanical linkage and said driving rod, after said driving rod has moved a predetermined distance said tripping member disengaging said latching member from said mechanical linkage, with said tube support sheet returning vigorously to its normal position contiguous to said sealing ring under the biasing action of said spring, so that said plurality of tubes will be cleared of any clogging matter disposed thereon during the drycleaning operation; and a safety switch operatively connected across said input switch and being activated by said camming member to prohibit said gear-motor from stopping while said tube support sheet is away from said sealing ring.

4. In drycleaning apparatus having a liquid filter arrangement of the character including a plurality of filter aid supports mounted in an enclosed vessel and adapted to receive a filter aid thereon, and having a displaceable member in said vessel for dislodging said filter aid, the improvement comprising:
electric motor means for driving said displaceable member;
first and second switch means in parallel for controlling energization of said electric motor means; and
means for maintaining one of said switch means in a position effecting energization of said electric motor means during intervals of displacement of said displaceable member regardless of the condition of said other switch means.

5. In drycleaning apparatus having a liquid filter arrangement of the character including a plurality of filter aid supports mounted in an enclosed vessel and adapted to receive a filter aid thereon, and having a displaceable member in said vessel for dislodging said filter aid, the improvement comprising:
electric motor means for driving said displaceable member;
cam means operated by said motor;
first and second parallel circuits for energizing said motor means, said first circuit including time controlled switch means for completing said first circuit, said second circuit including switch means controlled by said cam means for completing said second circuit to maintain energization of said motor means during intervals of displacement of said displaceable member regardless of the condition of said first circuit.

6. In drycleaning apparatus having a liquid filter arrangement of the character including a plurality of filter aid supports mounted in an enclosed vessel and adapted to receive a filter aid thereon, and having a displaceable member in said vessel for dislodging said filter aid, the improvement comprising:
an electric motor having a rotatable member mounted on its shaft;
linkage means connecting said rotatable member to effect movement of said displaceable member;
cam means driven by said electric motor;
time controlled first switch means for effecting energization of said motor during selected time intervals;
and second electrical switch means controlled by said cam means to maintain energization of said motor during periods other than said selected time intervals and corresponding to postions of said cam means in which said displaceable member is displaced.

References Cited by the Examiner
UNITED STATES PATENTS

| 786,549 | 4/1905 | Dion | 210—413 |
|---|---|---|---|
| 3,100,190 | 8/1963 | Hobson | 210—332 X |
| 3,169,109 | 2/1965 | Hirs | 210—138 X |

REUBEN FRIEDMAN, *Primary Examiner.*

J. DE CESARE, *Assistant Examiner.*